United States Patent
Huang et al.

(10) Patent No.: US 10,445,558 B2
(45) Date of Patent: Oct. 15, 2019

(54) SYSTEMS AND METHODS FOR DETERMINING USERS ASSOCIATED WITH DEVICES BASED ON FACIAL RECOGNITION OF IMAGES

(71) Applicant: Facebook, Inc., Menlo Park, CA (US)

(72) Inventors: Xun Wilson Huang, Alameda, CA (US); Jun Sun, Saratoga, CA (US); Zhiyang Wang, Mountain View, CA (US); Wenjie Lin, Mountain View, CA (US); Jieqi Yu, Sunnyvale, CA (US); Farhan Khan, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 112 days.

(21) Appl. No.: 15/652,180

(22) Filed: Jul. 17, 2017

(65) Prior Publication Data

US 2019/0019012 A1 Jan. 17, 2019

(51) Int. Cl.
| G06K 9/00 | (2006.01) |
| G06N 20/00 | (2019.01) |
| G06F 16/783 | (2019.01) |
| G06F 16/583 | (2019.01) |
| G06N 5/02 | (2006.01) |
| G06F 16/50 | (2019.01) |

(52) U.S. Cl.
CPC ....... G06K 9/00228 (2013.01); G06F 16/583 (2019.01); G06F 16/784 (2019.01); G06N 20/00 (2019.01); *G06F 16/50* (2019.01); *G06N 5/025* (2013.01)

(58) Field of Classification Search
CPC .......... G06K 9/00268; G06K 9/00228; G06K 9/00677; G06N 20/00; G06N 5/025; G06F 16/50; G06F 11/3438
USPC .......................................................... 382/118
See application file for complete search history.

(56) References Cited

U.S. PATENT DOCUMENTS

| 2015/0106368 | A1* | 4/2015 | Sohn ........................ G06Q 10/10 707/732 |
| 2015/0134687 | A1* | 5/2015 | Sohn ...................... H04L 65/403 707/758 |
| 2015/0332087 | A1* | 11/2015 | Joshi ........................ G06K 9/00 382/203 |
| 2016/0366242 | A1* | 12/2016 | Oh ........................... H04L 67/06 |
| 2017/0034097 | A1* | 2/2017 | Zhang ................. G06K 9/00677 |
| 2018/0316775 | A1* | 11/2018 | Kwon .................. G06Q 10/107 |

* cited by examiner

*Primary Examiner* — Ali Bayat
(74) *Attorney, Agent, or Firm* — Sheppard Mullin Richter & Hampton LLP

(57) ABSTRACT

Systems, methods, and non-transitory computer readable media can identify a user associated with a device based on a subset of media content items on the device based at least in part on analysis of the subset of media content items. A relationship between the user and one or more other users depicted in the media content items can be determined. A recommendation relating to sending at least one media content item on the device to at least of the one or more other users can be generated based on the determined relationship.

20 Claims, 8 Drawing Sheets

SYSTEMS AND METHODS FOR DETERMINING USERS ASSOCIATED WITH DEVICES BASED ON FACIAL RECOGNITION OF IMAGES

FIELD OF THE INVENTION

The present technology relates to the field of social networks. More particularly, the present technology relates to techniques for providing recommendations for sharing media content associated with social networking systems.

BACKGROUND

Today, people use computing devices (or systems) for a wide variety of purposes. Computing devices can provide different kinds of functionality. Users can utilize their computing devices to produce information, access information, and share information. In some cases, users can use their computing devices to generate or produce media content items, such as by taking pictures, recording videos, etc. In some instances, users can decide to share at least some of these or other media content items with one or more of the users' social connections or friends within social networking systems (or services).

Under conventional approaches, media content associated with the user, such as images or videos created by the user, are generally shared in an inefficient or cumbersome manner. For example, conventional approaches generally require manual effort to select certain media content items to be shared. In another example, conventional approaches generally rely on manual effort to determine with whom the selected media content items are to be shared.

SUMMARY

Various embodiments of the present disclosure can include systems, methods, and non-transitory computer readable media configured to identify a user associated with a device based on a subset of media content items on the device based at least in part on analysis of the subset of media content items. A relationship between the user and one or more other users depicted in the media content items can be determined. A recommendation relating to sending at least one media content item on the device to at least one of the one or more other users can be generated based on the determined relationship.

In some embodiments, the subset of media content items can be identified, wherein the subset of media content items are selfies.

In certain embodiments, the selfies are identified based on one or more of: a resolution associated with a media content item, a machine learning model, or a camera used to capture a media content item.

In an embodiment, the machine learning model is trained to determine attributes associated with visual content of media content items.

In some embodiments, one or more clusters of one or more faces detected in the selfies can be generated, and a cluster of the one or more clusters that has a highest distribution of faces can be identified as being associated with the user associated with the device.

In certain embodiments, a facial model for the user associated with the device can be generated based on the cluster associated with the user associated with the device.

In an embodiment, one or more clusters of faces detected in the media content items can be generated, and a facial model for each of the one or more clusters can be generated, wherein each of the one or more clusters is associated with a person.

In some embodiments, the recommendation indicates one or more media content items to send to a particular user of the one or more other users.

In certain embodiments, the recommendation indicates at least some of the one or more other users as potential recipients of a media content item.

In an embodiment, the recommendation indicates a user of the one or more other users that is not depicted in a media content item as a potential recipient of the media content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
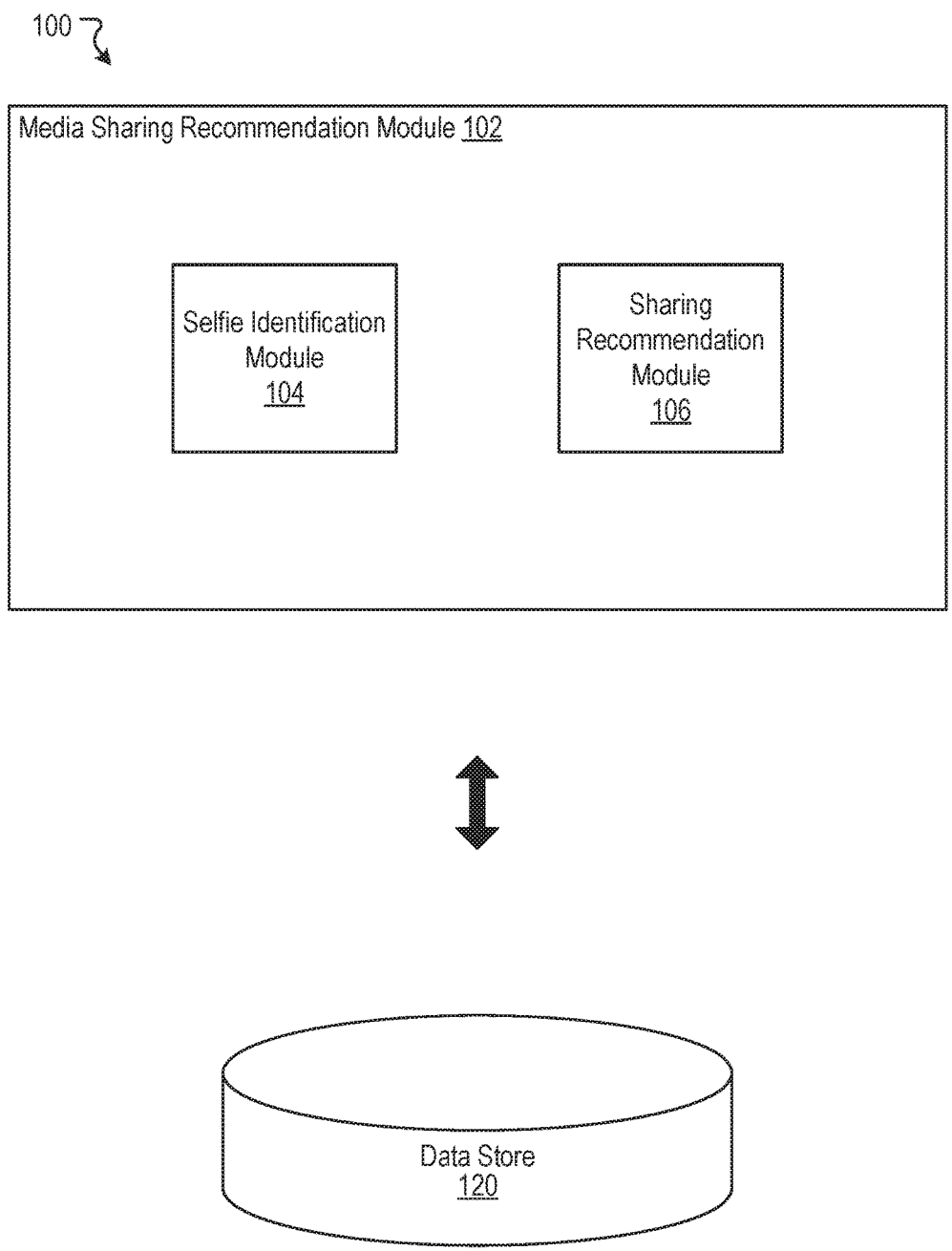
FIG. 1 illustrates an example system including an example media sharing recommendation module configured to provide recommendations for sharing media content items based on facial recognition techniques, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Determining Users Associated with Devices Based on Facial Recognition of Images

People use computing devices (or systems) for a wide variety of purposes. Computing devices can provide different kinds of functionality. Users can utilize their computing devices to produce information, access information, and share information. In some cases, users can use their computing devices to generate or produce media content items, such as by taking pictures, recording videos, etc. In some instances, users can decide to share at least some of these or other media content items with one or more of the users' social connections or friends within social networking systems (or services).

Conventional approaches specifically arising in the realm of computer technology generally require a significant amount of steps or actions to be taken in order for media content to be shared among users. Also, under conventional approaches, a significant amount of manual effort may be required to facilitate the sharing of media content. In some instances, conventional approaches may require a user to exert manual effort to select the media content to be shared. In some cases, the user has to exert effort in considering and deciding with which social connections the selected media content is to be shared, in accordance with conventional approaches. As such, these and other concerns associated with conventional approaches can cause media content sharing to be inefficient, inconvenient, and cumbersome.

An improved approach rooted in computer technology can overcome the foregoing and other disadvantages associated with conventional approaches specifically arising in the realm of computer technology. Based on computer technology, the disclosed technology can automatically recommend which media content items of users should be shared with which other users based on facial recognition techniques, for example, without express input from the users. For example, the disclosed technology can determine a user who is associated with a device (e.g., a computing device) and determine the user's relationships with other users included in media content items. Examples of devices can include mobile devices (e.g., mobile phones, tablets, etc.), desktop computers, laptop computers, etc. Examples of media content items can include images, such as photos, videos, etc. In some embodiments, media content items can be shared between users via a media sharing application ("app"). A user associated with a device ("device owner") can be determined based on "selfies" on the device. Whether photos are selfies can be determined based on resolutions or machine learning techniques. Facial analysis can be performed on faces appearing in selfies in order to identify the device owner. For example, faces detected in selfies can be clustered, and a cluster having the highest distribution of faces can be associated with the device owner. Once the device owner is determined, relationships between the device owner and users associated with other faces can be determined, for example, based on specified criteria and/or rules. The disclosed technology can provide recommendations on sharing media content items based on recognized faces and determined relationships. For example, the disclosed technology can provide recommendations regarding potential recipients of a media content item. As another example, the disclosed technology can provide recommendations regarding potential media content items to send to a user. In this manner, the disclosed technology can facilitate sharing of media content items between users and provide an efficient and easy way to share media content items. Users may opt in to or opt out of recommendations for sharing media content provided by the disclosed technology. Details relating to the disclosed technology are provided below.

FIG. 1 illustrates an example system 100 including an example media sharing recommendation module 102 configured to provide recommendations for sharing media content items based on facial recognition techniques, according to an embodiment of the present disclosure. The media sharing recommendation module 102 can include a selfie identification module 104 and a sharing recommendation module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the media sharing recommendation module 102 can be implemented in any suitable combinations. While the disclosed technology is described in connection with media content items associated with a social networking system for illustrative purposes, the disclosed technology can apply to any other type of system and/or content. In addition, photos are discussed herein as examples of media content items for illustrative purposes, but the disclosed technology can apply to any type of media content items, such as images, videos, etc.

The selfie identification module 104 can determine whether media content items are selfies. For example, selfies can be determined based on resolution information associated with media content items and machine learning techniques. Functionality of the selfie identification module 104 is described in more detail herein.

The sharing recommendation module 106 can provide recommendations for sharing media content items with users. For example, relationships between a device owner and other people depicted in media content items can be determined, and recommendations can be provided based on the determined relationships. For instance, a device owner can be identified based on selfies on a device. Functionality of the sharing recommendation module 106 is described in more detail herein.

In some embodiments, the media sharing recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the media sharing recommendation module 102 can be, in part or in whole, implemented as software running on one or more computing devices or systems, such as on a server system or a client computing device. In some instances, the media sharing recommendation module 102 can be, in part or in whole, implemented within or configured to operate in conjunction or be integrated with a social networking system (or service), such as a social networking system 630 of FIG. 6. Likewise, in some instances, the media sharing recommendation module 102 can be, in part or in whole, implemented within or configured to operate in conjunction or be integrated with a client computing device, such as the user device 610 of FIG. 6. For example, the media sharing recommendation module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the media sharing recommendation module 102. The data maintained by the data store 120 can include, for example, information relating to media content items, photos, selfies, facial recognition, facial models, clustering of faces, machine learning models, device owners, relationships between device owners and other users, recommendations regarding sharing media content items, etc. The data store 120 also can maintain other information associated with a social networking system. The information associated with the social networking system can include data about users, social connections, social interactions, locations, geofenced areas, maps, places, events, groups, posts, communications, content, account settings, privacy settings, and a social graph. The social graph can reflect all entities of the social networking system and their interactions. As shown in the example system 100, the media sharing recommendation module 102 can be configured to communicate and/or operate with the data store 120. In some embodiments, the data store 120 can be a data store within a client computing device. In some embodiments, the data store 120 can be a data store of a server system in communication with the client computing device.

Figure 2A:
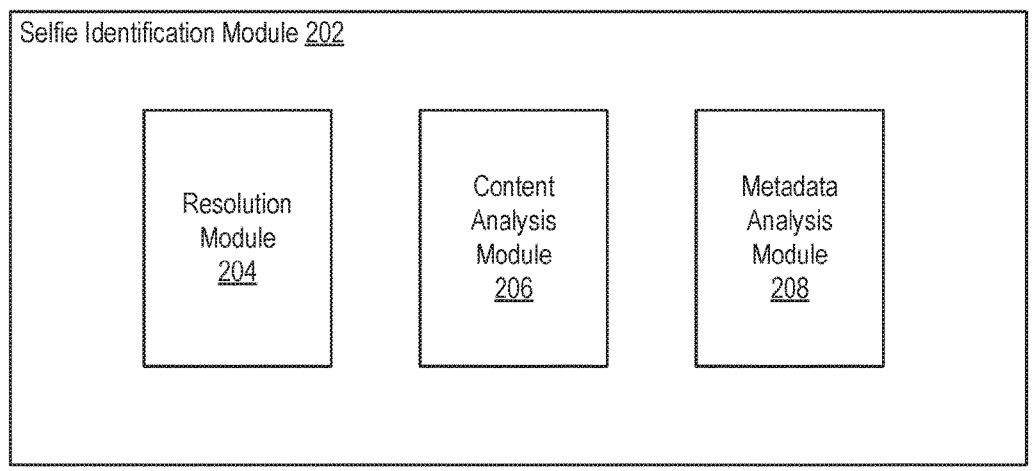
FIG. 2A illustrates an example selfie identification module configured to determine whether media content items are selfies, according to an embodiment of the present disclosure.

FIG. 2A illustrates an example selfie identification module 202 configured to determine whether media content items are selfies, according to an embodiment of the present disclosure. In some embodiments, the selfie identification module 104 of FIG. 1 can be implemented with the example selfie identification module 202. As shown in the example of FIG. 2A, the example selfie identification module 202 can include a resolution module 204, a content analysis module 206, and a metadata analysis module 208. The example selfie identification module 202 can determine whether media content items are selfies in various ways. For example, selfies can be identified based on resolution information associated with media content items. As another example, selfies can be identified by analyzing content of media content items. As yet another example, an identification of a photo as a selfie can be based on metadata associated with the photo. Media content items are described as photos for illustrative purposes, but media content items can include other types of media content.

The resolution module 204 can determine whether photos are selfies based on resolution information associated with photos. Devices such as mobile phones can have a front facing camera and a rear facing camera, and the front facing camera can generally have a lower resolution than the rear facing camera. Selfies are generally taken using the front facing camera. Accordingly, photos having lower resolutions are more likely to be selfies than photos having higher resolutions. The resolution module 204 can determine photos having lower resolutions than other photos as selfies. For example, the resolution module 204 can determine photos including at least one face and having lower resolutions than other photos as selfies.

The content analysis module 206 can determine whether photos are selfies based on analysis of visual content of photos. For example, the content analysis module 206 can determine various attributes associated with photos. Attributes can indicate whether photos depict certain subject matter, such as objects, animals, people (e.g., faces), concepts, themes, etc. Attributes can also indicate other characteristics associated with photos. For example, an attribute can indicate whether a photo is a selfie or not. The content analysis module 206 can determine attributes associated with photos based on machine learning techniques, such as computer vision techniques. For example, the content analysis module 206 can be based on object detection or recognition techniques, including, for example, face detection or face recognition techniques. The content analysis module 206 can train a machine learning model to determine a likelihood of photos being associated with various attributes. For example, various attributes can correspond to categories, and the machine learning model can be trained to determine a likelihood of photos being associated with various categories. In some embodiments, the machine learning model can include a neural network, such as a deep neural network (DNN), a convolutional neural network (CNN), etc. The machine learning model can be trained based on training data including images and associated labels corresponding to various attributes. For example, the training data can include images depicting various objects labeled with corresponding labels for the various objects. As another example, the training data can include images depicting faces labeled with a label for faces, and the machine learning model can be trained to detect faces in photos. For instance, the machine learning model can detect faces without determining identity of the detected faces. In certain embodiments, the machine learning model can also be trained to determine attributes associated with faces, such as an age or age range (e.g., a child, an adult, etc.), a gender, etc. As a further example, the training data can include images that are selfies labeled with a label for selfies, and the machine learning model can be trained to determine whether a photo is a selfie based on various features, such as a number of faces depicted in a photo, a size of one or more faces depicted in a photo, etc. The content analysis module 206 can retrain the machine learning model based on new or updated training data if new or updated information relating to various attributes becomes available. One or more machine learning models discussed herein, for example, in connection with the media sharing recommendation module 102, can be implemented separately or in combination, for example, as a single machine learning model, as multiple machine learning models, as one or more staged machine learning models, as one or more combined machine learning models, etc.

The content analysis module 206 can apply the trained machine learning model to determine various attributes associated with photos. For instance, a photo can be provided to the trained machine learning model as input, and the trained machine learning model can indicate whether the photo is associated with particular attributes. In some embodiments, the trained machine learning model can output a score for each attribute that is indicative of a likelihood of the photo being associated with the attribute. For example, the trained machine learning model can output a score for an attribute indicating whether the photo is a selfie (a "selfie attribute"). The content analysis module 206 can determine a photo to be a selfie if the score for the selfie attribute satisfies a threshold value. In some embodiments, the content analysis module 206 can determine various attributes associated with photos in or near real time.

The metadata analysis module 208 can obtain metadata associated with a photo. In some embodiments, photos may be associated with metadata that indicates which camera of a device was used to take the photos. For example, metadata can indicate whether a photo was taken by a front facing camera or a rear facing camera. In these embodiments, the metadata analysis module 208 can identify photos as selfies when the photos are taken by a front facing camera and include faces. A determination of the presence of a face in a photo can be provided by the content analysis module 206.

All examples herein are provided for illustrative purposes, and there can be many variations and other possibilities.

Figure 2B:
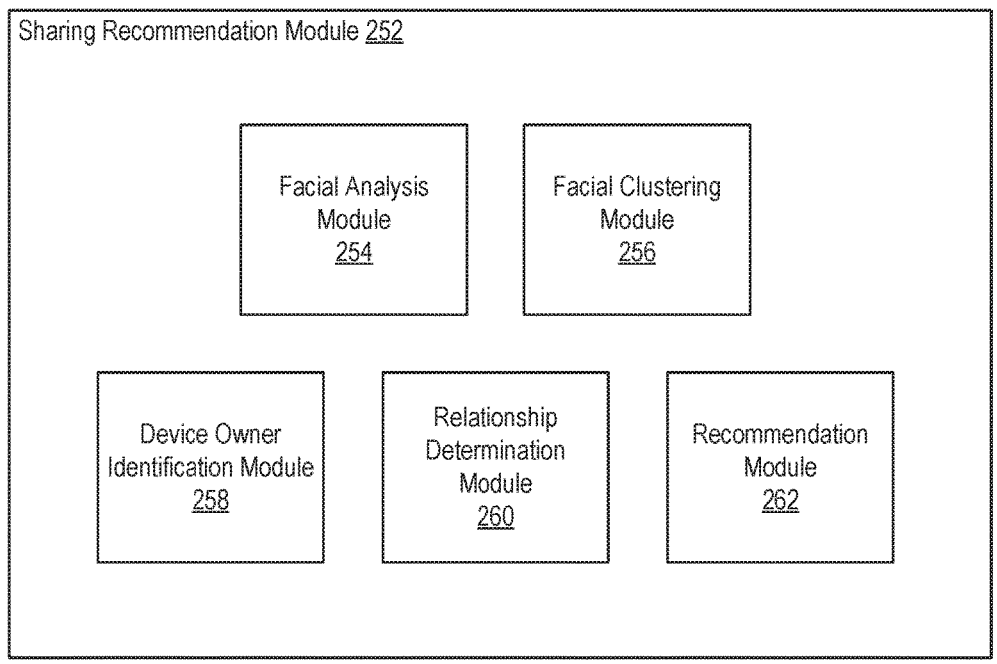
FIG. 2B illustrates an example sharing recommendation module configured to provide recommendations for sharing media content items with users, according to an embodiment of the present disclosure.

FIG. 2B illustrates an example sharing recommendation module 252 configured to provide recommendations for sharing media content items with users, according to an embodiment of the present disclosure. In some embodiments, the sharing recommendation module 106 of FIG. 1 can be implemented with the example sharing recommendation module 252. As shown in the example of FIG. 2B, the example sharing recommendation module 252 can include a facial analysis module 254, a facial clustering module 256, a device owner identification module 258, a relationship determination module 260, and a recommendation module 262. Media content items are described as photos for illustrative purposes, but media content items can include other types of media content.

The facial analysis module 254 can detect and recognize one or more faces depicted in photos. The facial analysis module 254 can detect and recognize faces based on machine learning techniques, such as machine vision or computer vision techniques. In some embodiments, the machine learning model can include a neural network, such as a deep neural network (DNN), a convolutional neural network (CNN), etc. In some embodiments, the facial analysis module 254 can train a machine learning model to detect and recognize faces in photos based on labeled training data. For instance, a photo can be provided to the trained machine learning model as input, and the trained machine learning model can output representations of faces in photos. A representation of a face can include a set of features, which can be expressed as a feature vector in some instances. For example, the set of features can relate to various facial features, such as a length of face, a location of eyes, a size of eyes, a distance between eyes, a length of a nose, a size of a mouth, etc. In some embodiments, the set of features can include various attributes associated with faces, such as an age or age range (e.g., a child, an adult, etc.), a gender, etc. In certain embodiments, the trained machine learning model can output an identification of each face depicted in the photo or a probability that an identified person is depicted in the photo. In some embodiments, the facial analysis module 254 can detect or recognize faces depicted in photos in real time or near real time. The facial analysis module 254 can retrain the machine learning model based on new or updated training data as new or updated information relating to faces and associated attributes becomes available.

The facial clustering module 256 can cluster one or more faces that are detected in photos. For example, the facial clustering module 256 can cluster representations of faces that are detected by the facial analysis module 254. In some embodiments, each representation of a face can be expressed as a feature vector, and the representation can be plotted in a suitable n-dimensional feature space. The representations of faces can be clustered according to any suitable clustering technique. Representations of faces that form a cluster are likely to be associated with the same person. Accordingly, different clusters of representations of faces can indicate different people depicted in photos. The facial clustering module 256 can identify one or more people based on clusters. For example, each cluster can correspond to a person. The size of clusters or the distribution of faces across clusters can indicate a degree or extent to which people associated with the clusters appear in photos. For example, a large cluster can indicate that a person associated with the cluster appears frequently in photos. In contrast, a small cluster can indicate that a person associated with the cluster does not appear frequently in photos. In some embodiments, the facial clustering module 256 can provide continuous clustering of a person over time. The face of a person can change as the person grows up. Accordingly, clusters of a person's face over time can be merged into a continuous spectrum such that the person can be identified or recognized over time.

The device owner identification module 258 can determine a device owner associated with a computing device. In some embodiments, a device owner can be a user who primarily uses a computing device. Selfies can be used to identify a device owner. In general, a face that appears the most frequently in selfies is likely to be the face of the device owner. The device owner identification module 258 can determine a device owner from clustering of faces detected in selfies on a device. For example, selfies can be determined by the selfie identification module 202, as described above. Faces in selfies can be detected by the facial analysis module 254, as described above. Clusters of faces detected in selfies can be determined by the facial clustering module 256, as described above. A cluster having the largest size or highest distribution of faces can be determined to be associated with the device owner. Accordingly, representations of faces in the cluster can be determined to be representations of the face of the device owner. A facial model (or template) of the device owner can be generated based on the representations of faces in the cluster. In some embodiments, the facial model can be based on some or all of the representations of faces in the cluster. In some embodiments, the facial model can be sent via a user account associated with a device owner to a server associated with a social networking system. The user account, which can be accessed through an application running on a computing device of the device owner, can be used to identify the device owner and associate the device owner with the facial model. The server can store the facial model in a data store to determine relationships involving the device owner and other people depicted in photos.

The relationship determination module 260 can determine relationships between a device owner and people associated with other faces depicted in photos. Once a device owner of a device is determined based on selfies, faces depicted in photos on the device can be detected and recognized. For instance, photos that are not selfies can depict additional people who do not appear in the selfies. Also, photos that are not selfies can include additional depictions of people appearing in the selfies. Accordingly, faces can be detected and recognized for all photos on the device, for example, including selfies and photos that are not selfies. For example, the faces depicted in the photos on the device can be detected by the facial analysis module 254, as described above. The detected faces can be clustered by the facial cluster module 256 to determine one or more persons associated with the faces. As mentioned above, each cluster may correspond to a person. For example, clusters other than a cluster associated with the device owner can be associated with other people. Facial models for other people can be generated based on corresponding clusters. For instance, a facial model can be generated for each of the other people based on representations of faces in a corresponding cluster. In some embodiments, the facial model for a person can be based on some or all of the representations of faces in the cluster. The facial model for a person can be compared to facial models stored in a social networking system to determine an identity of the person. For example, the person can be a user of the social networking system.

The relationship determination module 260 can determine relationships between a device owner and other people depicted in photos. In some embodiments, relationships between the device owner and other people can be determined based on rules or suitable criteria. In some embodiments, various attributes associated with faces, such as an age range or a gender, can be used to determine relationships. Various attributes associated with faces can be determined by the content analysis module 206 and/or the facial analysis module 254, as described above. For example, a person that is in a similar age range as the device owner and is depicted frequently in photos can be inferred to be a significant other of the device owner. As another example, a person that is a child and is depicted frequently in photos can be inferred to be a child of the device owner. As yet another example, a person that appears to be one generation below the device owner and is depicted frequently in photos can also be inferred to be a child of the device owner. In a further example, a person that appears to be one generation above the device owner and is depicted frequently can be inferred to be a parent of the device owner. As used herein, "frequently" can refer to a frequency value that satisfies a threshold frequency value. In some instances, the threshold frequency value can be based at least in part on a ratio of a number of appearances of a person of interest in photos in comparison to a number of appearances of all other persons in the photos. Many other rules and suitable criteria to determine relationships are possible. In some embodiments, a family tree of the device owner can be determined.

The recommendation module 262 can provide recommendations on sharing photos. For example, the recommendation module 262 can provide recommendations based on relationships between the device owner and other people depicted in photos as determined by the relationship determination module 260, as described above. Other people depicted in photos may also be users of the social networking system, and the recommendation module 262 can provide recommendations to share photos with one or more of such users. In some embodiments, the recommendation module 262 can provide to a device owner a recommendation to share one or more photos with a particular user. For example, the recommendation can provide a suggested set of photos to send to a particular user. In other embodiments, the recommendation module 262 can provide to a device owner a recommendation to share a particular photo with one or more users. For example, the device owner can be viewing a specific photo, and the recommendation can provide a suggested set of users to whom to send the photo. Many variations are possible. In some embodiments, the recommendation module 262 can provide recommendations to share photos with users that are not depicted in the photos. For example, a significant other of the device owner may be interested in receiving photos of a child of the device owner even if the significant other does not appear in the photos. In certain embodiments, the recommendation module 262 can rank recommendations based on a type of relationship that is determined between the device owner and another user. As an example, a recommendation relating to a significant other or a child can be ranked more highly than a recommendation relating to a parent, or vice versa. In some embodiments, users can share photos using a media sharing app, and recommendations for sharing photos can be provided within the media sharing app. For example, the recommendations can be displayed to a device owner in a user interface of the media sharing app executing on a computing device of the device owner. Many variations are possible.

In this way, the disclosed technology can facilitate sharing media content items with users to whom the media content items may be of interest. Recommendations for sharing media content items can be based on determinations of relationships between a device owner and other people in media content items. Recommendations to share media content items can be generated automatically without a device owner having to label or tag people depicted in photos. In some embodiments, the disclosed technology can provide recommendations for sharing media content items as an option, and users can opt in to recommendations. In other embodiments, the disclosed technology can provide recommendations for sharing media content items as default, and users can opt out of recommendations. All examples herein are provided for illustrative purposes, and there can be many variations and other possibilities.

Figure 3:
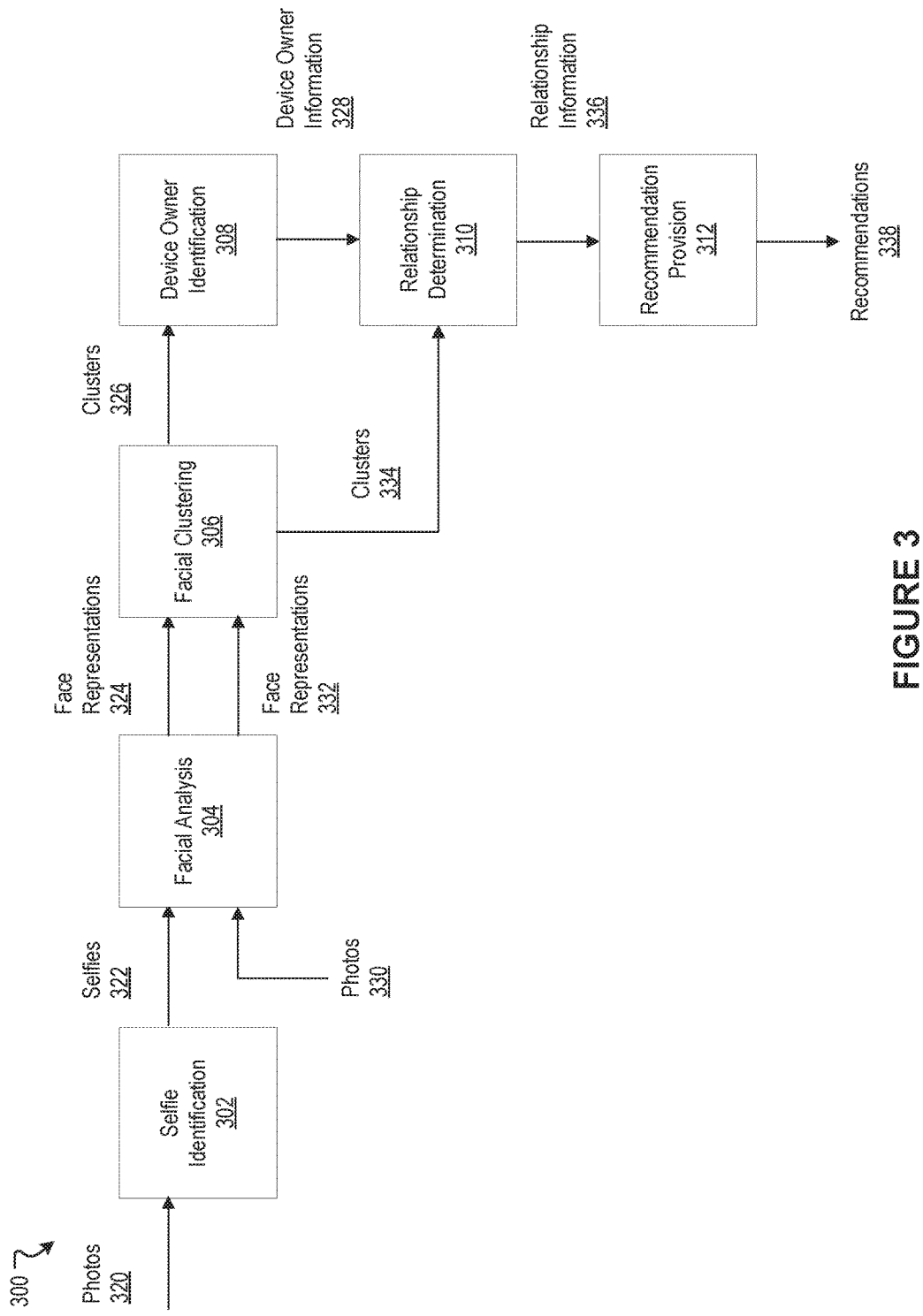
FIG. 3 illustrates an example scenario for providing recommendations for sharing media content items based on facial recognition techniques, according to an embodiment of the present disclosure.

FIG. 3 illustrates an example scenario 300 for providing recommendations for sharing media content items based on facial recognition techniques, according to an embodiment of the present disclosure. In the example scenario 300, at block 302, photos 320 on a device can be analyzed to identify which of the photos 320 are selfies, and selfies 322 from the photos 320 are identified. At block 304, facial analysis can be performed. For example, faces can be detected in the selfies 322, and face representations 324 can be determined for the detected faces. At block 306, clusters 326 of the face representations 324 can be generated. A cluster having a highest number or distribution of faces can be determined to be associated with a device owner. At block 308, device owner information 328 relating to a device owner can be determined based on the clusters 326 or information associated with the clusters 326. As discussed, in some instances, the device owner information 328 can include a facial model associated with the device owner that is generated based on the clusters 326. At block 310, relationship information 336 relating to relationships involving the device owner can be determined based in part on the device owner information 328.

Once the device owner is determined based on the selfies 322, photos 330 on the device can be provided for facial analysis. People other than the device owner are less likely to appear in the selfies 322, and accordingly, facial analysis and facial clustering can be performed for all photos on the device, including photos that are not selfies. In some embodiments, the photos 330 can be the same as the photos 320. At block 304, faces in the photos 330 can be detected, and face representations 332 for the detected faces can be determined. At block 306, clusters 334 of the face representations 332 can be generated. Each of the clusters 334 can indicate a person and can be used to identify people other than the device owner in the photos 330. In some embodiments, the face representations 324 and the clusters 326 based on the selfies 322 can be used to identify people other than the device owner. As discussed, facial models based on the clusters 334 (or the clusters 326) can be compared with stored facial models associated with known persons to identify the people depicted in the photos 330. At block 310, the relationship information 336 relating to relationships between the device owner and other people depicted in the photos 330 can be determined, for example, based at least in part on the device owner information 328. At block 312, recommendations 338 are provided to the device owner for sharing at least some of the photos 330 with one or more other users based on the relationship information 336. All examples herein are provided for illustrative purposes, and there can be many variations and other possibilities.

Figure 4:
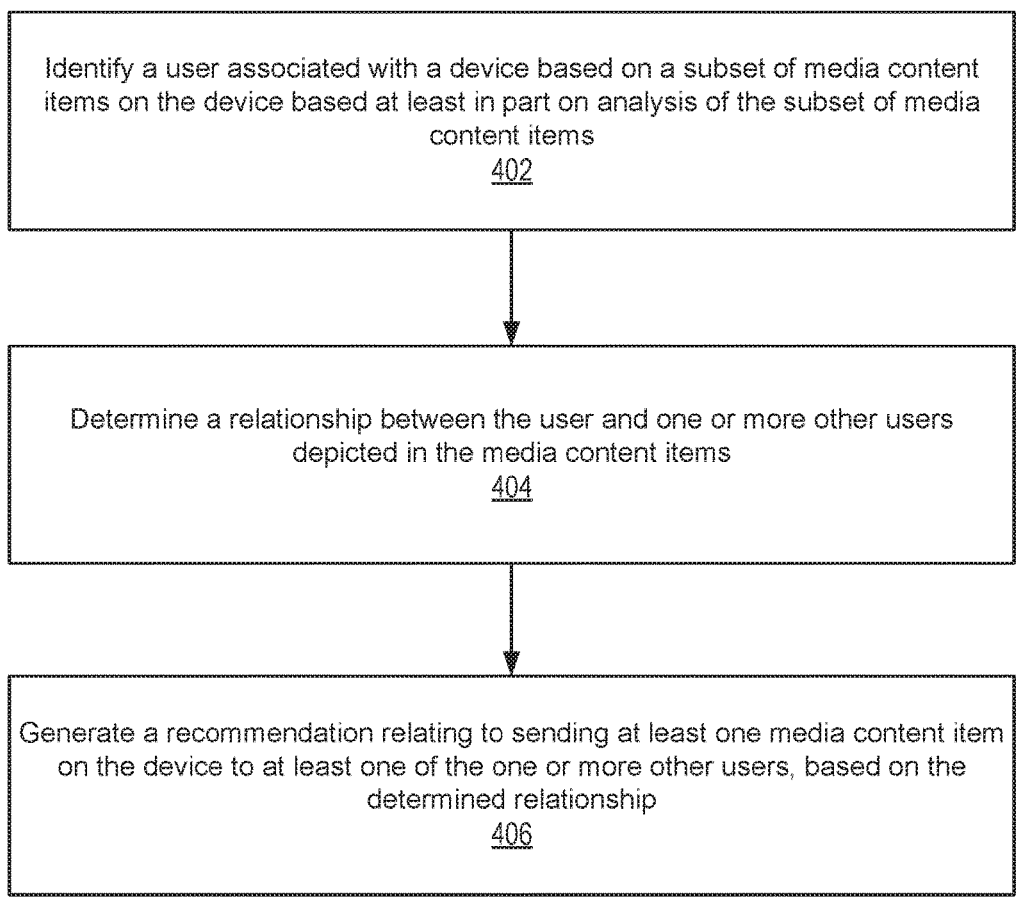
FIG. 4 illustrates an example first method for providing recommendations for sharing media content items based on facial recognition techniques, according to an embodiment of the present disclosure.

FIG. 4 illustrates an example first method 400 for providing recommendations for sharing media content items based on facial recognition techniques, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can identify a user associated with a device based on a subset of media content items on the device based at least in part on analysis of the subset of media content items. At block 404, the example method 400 can determine a relationship between the user and one or more other users depicted in the media content items. At block 406, the example method 400 can generate a recommendation relating to sending at least one media content item on the device to at least one of the one or more other users, based on the determined relationship. Other suitable techniques that incorporate various features and embodiments of the present disclosure are possible.

Figure 5:
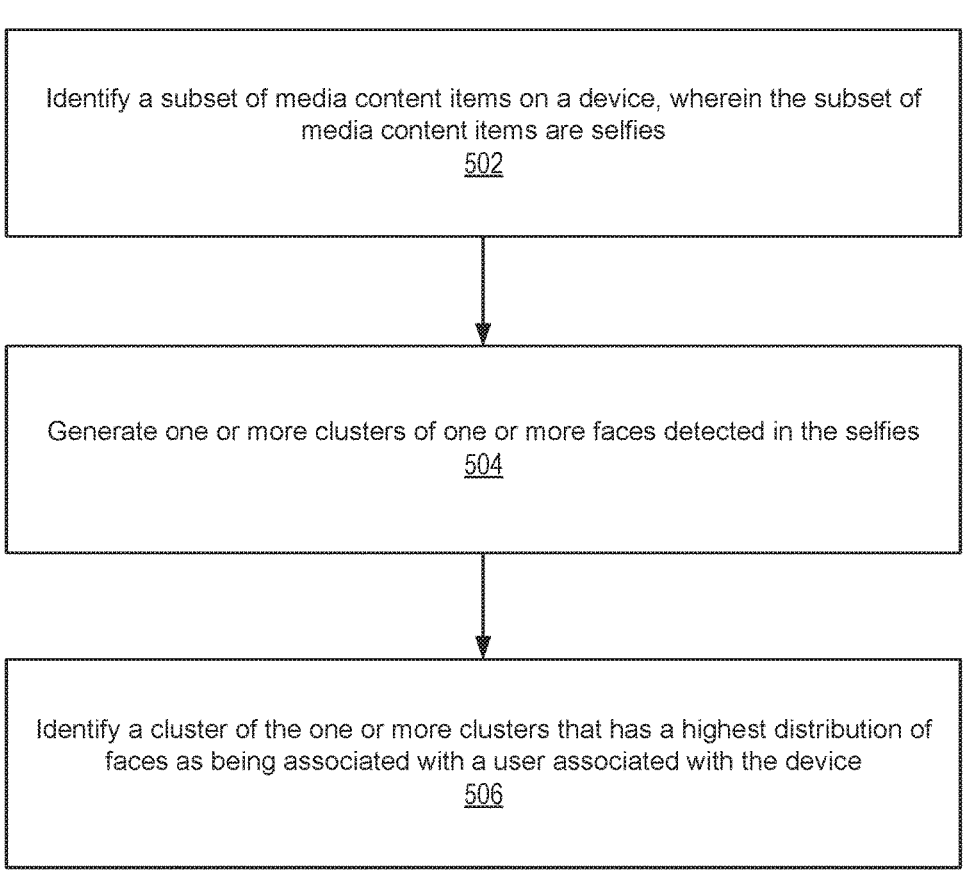
FIG. 5 illustrates an example second method for providing recommendations for sharing media content items based on facial recognition techniques, according to an embodiment of the present disclosure.

FIG. 5 illustrates an example second method 500 for providing recommendations for sharing media content items based on facial recognition techniques, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can identify a subset of media content items on a device, wherein the subset of media content items are selfies. The subset of media content items can be similar to the subset of media content items explained in connection with FIG. 4. The device can be similar to the device explained in connection with FIG. 4. At block 504, the example method 500 can generate one or more clusters of one or more faces detected in the selfies. At block 506, the example method 500 can identify a cluster of the one or more clusters that has a highest distribution of faces as being associated with a user associated with the device. The user associated with the device can be similar to the user associated with the device explained in connection with FIG. 4. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
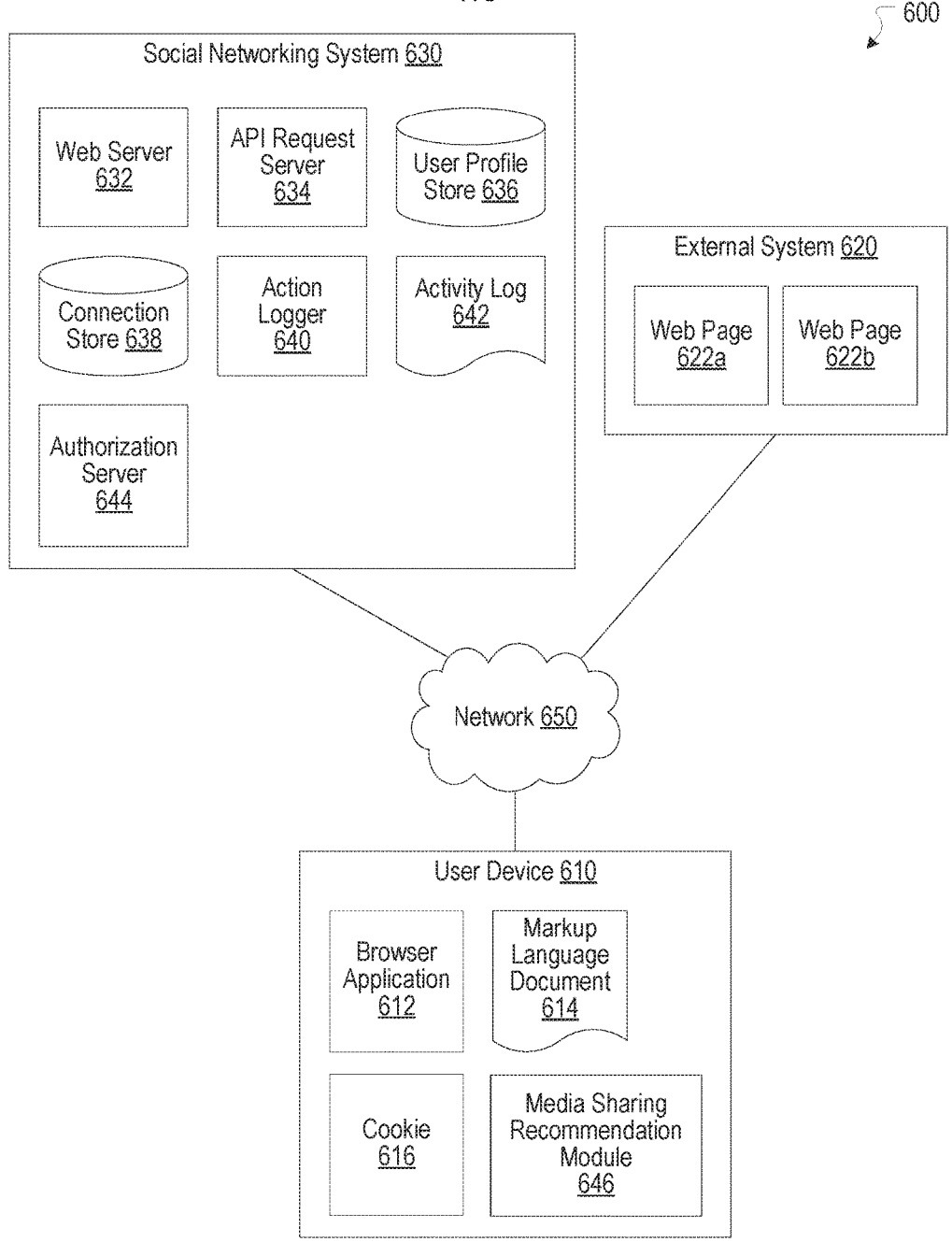
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a media sharing recommendation module 646. The media sharing recommendation module 646 can be implemented with the media sharing recommendation module 102, as discussed in more detail herein. In some embodiments, one or more functionalities of the media sharing recommendation module 646 can be implemented in the social networking system 630.

Hardware Implementation

Figure 7:
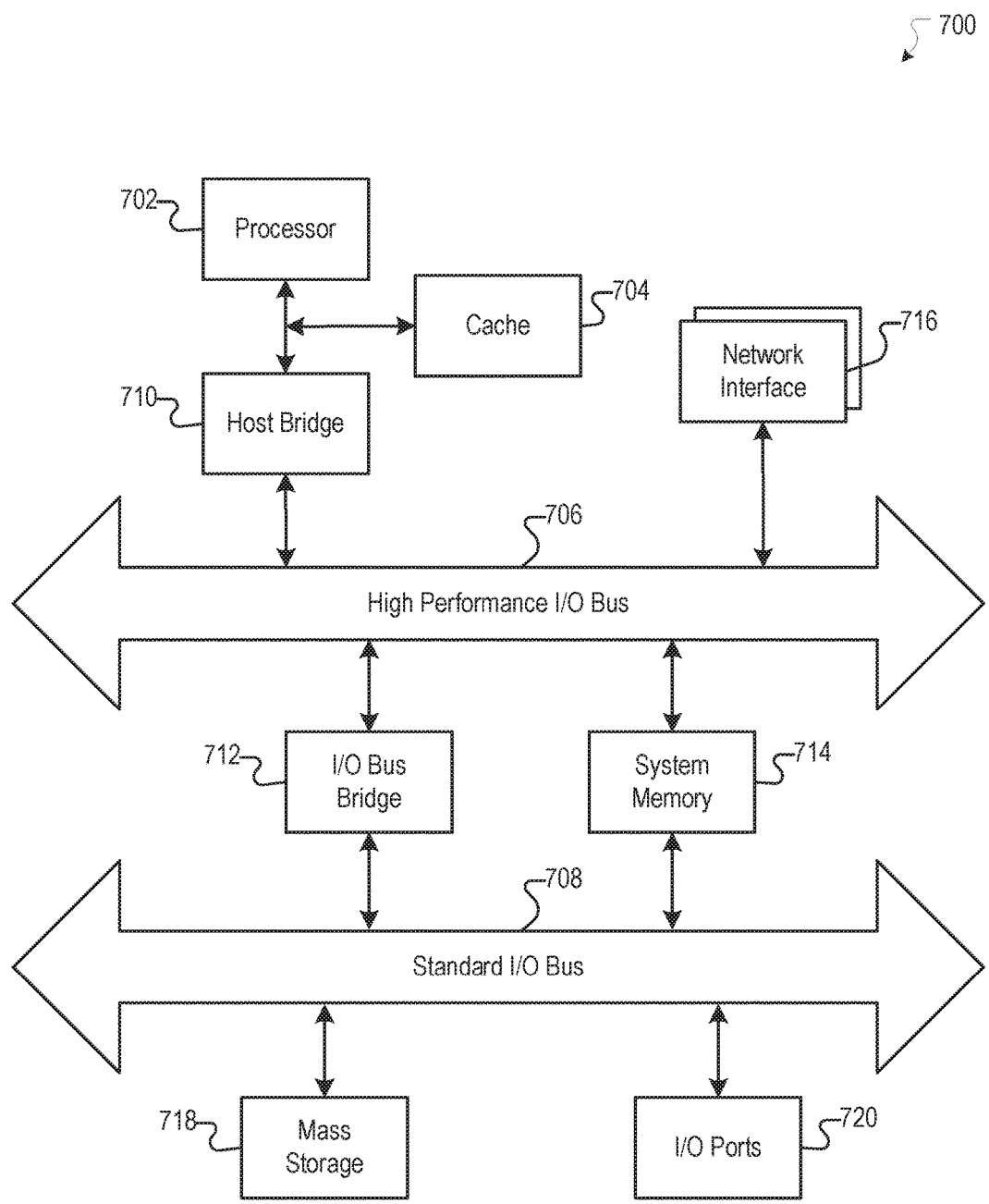
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a user associated with a device based on a subset of media content items on the device based at least in part on analysis of the subset of media content items, wherein the identifying comprises:
      clustering of one or more face representations depicted in the subset of media content items, and
      determining a face representation from the one or more face representations that corresponds to a cluster with a highest number of face representations;
   determining, by the computing system, a relationship between the user and one or more other users depicted in the media content items; and
   generating, by the computing system, a recommendation relating to sending at least one media content item on the device to at least one of the one or more other users, based on the determined relationship.

2. The computer-implemented method of claim 1, further comprising identifying the subset of media content items, wherein the subset of media content items are selfies.

3. The computer-implemented method of claim 2, wherein the selfies are identified based on one or more of: a resolution associated with a media content item, a machine learning model, or a camera used to capture a media content item.

4. The computer-implemented method of claim 3, wherein the machine learning model is trained to determine attributes associated with visual content of media content items.

5. The computer-implemented method of claim 2, further comprising:
   generating one or more clusters of one or more faces detected in the selfies; and
   identifying a cluster of the one or more clusters that has a highest distribution of faces as being associated with the user associated with the device.

6. The computer-implemented method of claim 5, further comprising generating a facial model for the user associated with the device based on the cluster associated with the user associated with the device.

7. The computer-implemented method of claim 1, further comprising:
   generating one or more clusters of faces detected in the media content items; and
      generating a facial model for each of the one or more clusters, wherein each of the one or more clusters is associated with a person.

8. The computer-implemented method of claim 1, wherein the recommendation indicates one or more media content items to send to a particular user of the one or more other users.

9. The computer-implemented method of claim 1, wherein the recommendation indicates at least some of the one or more other users as potential recipients of a media content item.

10. The computer-implemented method of claim 1, wherein the recommendation indicates a user of the one or more other users that is not depicted in a media content item as a potential recipient of the media content item.

11. A system comprising:
    at least one hardware processor; and
    a memory storing instructions that, when executed by the at least one processor, cause the system to perform:
       identifying a user associated with a device based on a subset of media content items on the device based at least in part on analysis of the subset of media content items, wherein the identifying comprises:
          clustering of one or more face representations depicted in the subset of media content items, and
          determining a face representation from the one or more face representations that corresponds to a cluster with a highest number of face representations;
       determining a relationship between the user and one or more other users depicted in the media content items; and
       generating a recommendation relating to sending at least one media content item on the device to at least one of the one or more other users, based on the determined relationship.

12. The system of claim 11, wherein the instructions further cause the system to perform identifying the subset of media content items, wherein the subset of media content items are selfies.

13. The system of claim 12, wherein the selfies are identified based on one or more of: a resolution associated with a media content item, a machine learning model, or a camera used to capture a media content item.

14. The system of claim 12, wherein the instructions further cause the system to perform:
   generating one or more clusters of one or more faces detected in the selfies; and
   identifying a cluster of the one or more clusters that has a highest distribution of faces as being associated with the user associated with the device.

15. The system of claim 11, wherein the recommendation indicates a user of the one or more other users that is not depicted in a media content item as a potential recipient of the media content item.

16. A non-transitory computer readable medium including instructions that, when executed by at least one hardware processor of a computing system, cause the computing system to perform a method comprising:
   identifying a user associated with a device based on a subset of media content items on the device based at least in part on analysis of the subset of media content items, wherein the identifying comprises:
      clustering of one or more face representations depicted in the subset of media content items, and
      determining a face representation from the one or more face representations that corresponds to a cluster with a highest number of face representations;
   determining a relationship between the user and one or more other users depicted in the media content items; and
   generating a recommendation relating to sending at least one media content item on the device to at least one of the one or more other users, based on the determined relationship.

17. The non-transitory computer readable medium of claim 16, wherein the method further comprises identifying the subset of media content items, wherein the subset of media content items are selfies.

18. The non-transitory computer readable medium of claim 17, wherein the selfies are identified based on one or more of: a resolution associated with a media content item, a machine learning model, or a camera used to capture a media content item.

19. The non-transitory computer readable medium of claim 17, wherein the method further comprises:
   generating one or more clusters of one or more faces detected in the selfies; and
   identifying a cluster of the one or more clusters that has a highest distribution of faces as being associated with the user associated with the device.

20. The non-transitory computer readable medium of claim 16, wherein the recommendation indicates a user of the one or more other users that is not depicted in a media content item as a potential recipient of the media content item.

* * * * *